United States Patent Office 3,046,172
Patented July 24, 1962

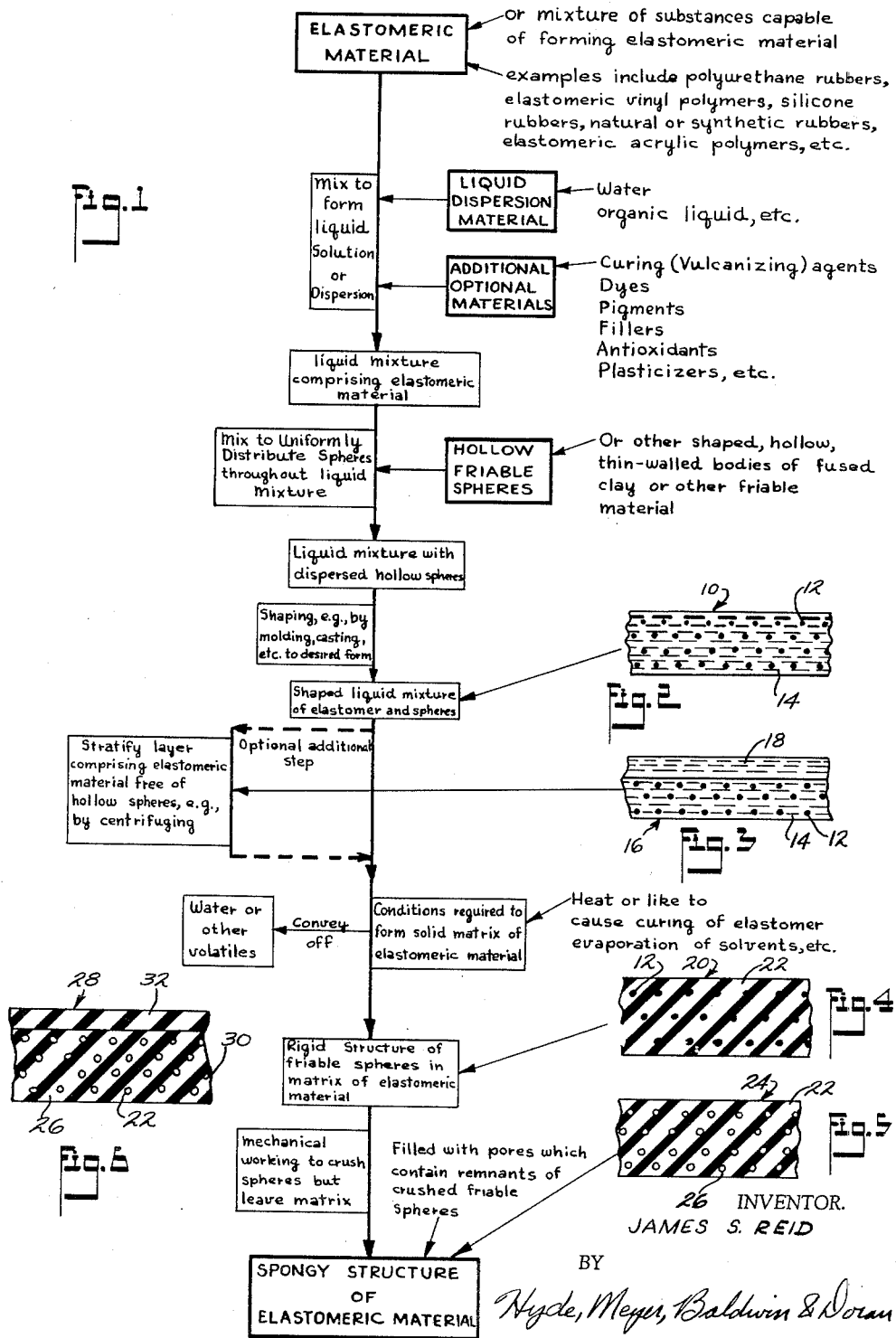

3,046,172
SPONGY ELASTOMERIC MATERIALS AND METHODS AND PRODUCTS USED IN THE MANUFACTURE OF THE SAME
James S. Reid, Hudson, Ohio, assignor to The Standard Products Company, Cleveland, Ohio, a corporation of Ohio
Filed Mar. 26, 1959, Ser. No. 802,210
6 Claims. (Cl. 154—46)

This invention relates (a) to spongy sheets and other structures made of elastomeric material, (b) to laminar sheets and other structures of elastomeric material containing dispersed therein a multitude of friable small spheres or similar bodies, and (c) to methods for the manufacture of these products. Stated in another way, this invention relates to new methods for the production of so-called "sponge rubber" or similar porous, resilient products, and to new spongy structures produced by such new manufacturing methods.

Flexible closed cell foamed articles of natural rubber, synthetic rubbers, and plastic materials have great potential for commercial applications such as in shoe soles and innersoles, heels, life preservers, gaskets and sealing strips, including those used in automobile doors and trunk lids.

However, the flexible foamed articles have been expensive to make, their cell structures and cell sizes have not been as uniform as desired, and generally it has not been possible to make a continuous integral article such as a sealing strip having one or more portions or layers which are porous and flexible while other portions are rigid and relatively inflexible.

One object of this invention is the provision of new improvements in the art of producing spongy elastomeric materials, and the provision of new spongy structures of elastomeric materials.

Another object is to provide a convenient inexpensive method of preparing flexible cellular materials of rubber, synthetic rubber and plastic elastomers in which the cell structure is very uniform and predominantly of the closed cell type.

It is an object to provide new forms of sponge rubber and similar spongy structures of elastomeric materials which utilize small, hollow spheres that are adhesively coated or otherwise held in place, in part at least, by adhesive means so as to prevent or minimize escape of said spheres at the exposed surfaces of the structures in which they are used.

Another object is to provide new structures of rubber, plastic or other suitable material in which certain portions or sections thereof are of spongy character and in which certain other portions or sections, integral with the spongy portions or sections, are of non-spongy character.

Another object is to provide a new method for the production of integral structures of rubber, plastic or other suitable material, and in which methods gravitational force, centrifugal force or other suitable means is utilized to produce portions or sections of flexible spongy form and other portions or sections, integral therewith, of non-spongy form or rigid spongy form.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

In accordance with the present invention, it has been found that flexible closed cell foamed articles of rubber having a very uniform cell structure and uniform cell size can be produced by a convenient, inexpensive method in which a plurality of friable hollow generally spherical bodies made preferably of clay are uniformly dispersed throughout a matrix of rubber or other elastomeric material to form a moldable composition, the composition is shaped, and thereafter the composition is crushed to reduce at least a majority of the hollow spherical bodies to powder and provide a flexible resilient cellular composition having uniform cell size and structure.

The hollow spherical bodies can be dispersed in a paste like mixture of elastomer in which the rubber is a continuous phase and has a very low Mooney viscosity, say less than 30 (using a large rotor at 212° F. 4 minutes), using an internal mixer such as a Banbury mixer which does not crush the hollow spheres. The spheres are preferably dispersed in liquid mixture such as a rubber latex in which a liquid such as water is a continuous phase and the rubber or other elastomer is present in the dispersion in the form of discrete particles. Paddle mixers, stirrers or centrifuges which do not break and crumble the thin-walled spheres, can be used to form the mixture of spheres within an elastomer matrix.

However, by far the best sponge structures are prepared by mixing the hollow friable spheres with a liquid elastomer which is a liquid polyester-polyisocyanate urethane although good results are also obtained using a liquid polyvinylchloride or copolymer of vinyl chloride and vinyl acetate plastisol.

The liquid polyurethane and plastisols of polyvinyl chloride form solid elastomers upon vulcanization that have good tensile strength and elongation properties along with a relatively high hardness. Apparently a relatively high tensile strength, say about 1500 p.s.i. or more and good elongation, say about 200 percent or more, enable the vulcanized elastomer binder to withstand crushing or pounding necessary to break the hollow spheres without damage such as cracking or tearing. A fairly high hardness value, say at least about 25 Shore "A" durometer, is apparently also required to build up enough stress in the rubbery binder to crush the hollow spheres.

In a preferred embodiment, the molded elastomeric structure is accomplished by (1) preparing or otherwise providing a liquid mixture of an elastomer, or a mixture of reactants which can be combined in the mixture under suitable conditions to form an elastomer, and (2) dispersing therein a multitude of small, friable, hollow bodies, preferably hollow spheres, (3) disposing such hollow bodies or spheres in only one or more portions or sections of said liquid mixture if such disposition of said hollow bodies or spheres is desired, (4) molding such a liquid mixture of elastomer precursor and hollow friable bodies into a desired shape, (5) subjecting the molded liquid mixture to conditions required to solidify the same, in the desired final shape, so that the hollow bodies will be fixed in a solid matrix of elastomeric material.

The liquid mixture of elastomeric precursor and hollow spheres can be formed in a number of different ways and may consist of organic solvent solutions of the elastomer or organic liquid or aqueous dispersions of the same. Also, the invention is concerned with the use of hollow spheres made of clayey material, since such friable bodies have been discovered to be uniquely suited to the new spongy elastomeric material production. However, the invention contemplates the use of materials other than clay to form the friable hollow spheres or other bodies and the use of hollow bodies of many different sizes, although, in certain forms of the invention, the hollow bodies are of substantially uniform size, or slightly varied size within a narrow range.

In order to obtain a more complete understanding of the new methods and products of this invention, reference is made to the accompanying drawings in which:

FIG. 1 is a flow sheet of the processes of this invention.

FIG. 2 is an enlarged diagrammatic fragmentary view of the liquid mixture of elastomeric material and hollow spheres shaped in the form of a sheet obtained in one step of the processes of this invention.

FIG. 3 is an enlarged fragmentary diagrammatic view, similar to FIG. 2, showing a modified form of liquid mixture obtained in the course of the new operations.

FIG. 4 is a diagrammatic, fragmentary, enlarged view of a sheet of rigid material obtained as a step in the new processes.

FIG. 5 is a diagrammatic enlarged fragmentary view of a sheet of spongy elastomeric material as obtained according to the processes of this invention.

FIG. 6 is a diagrammatic view, similar to FIG. 4, whch shows a modified form of spongy elastomeric material sheet which can be obtained from the mixture shown in FIG. 3.

Referring in more detail to the drawings, FIG. 1 shows in outline form the important steps and materials utilized in forming the spongy structures of elastomeric material in accordance with this invention. Of course, since it is not possible to include all of the information regarding the new operations on this flow diagram, it is necessary to refer to the detailed discussion presented hereinafter to obtain information on the details of the new procedures and products.

FIGS. 2 to 5 have been included in order to provide a better understanding of the various mixtures and products which are obtained at different stages of the new operations. It should be realized that these figures are completely diagrammatic in nature and no attempt has been made to show the hollow spheres to scale, either as to their distribution or as to their actual size.

In FIG. 2, the liquid mixture 10 comprises a multitude of hollow spheres 12 substantially uniformly distributed throughout a liquid mass comprising an elastomeric material or a mixture of substances capable of reacting to form an elastomeric material. An arrow has been used in this figure and also in FIGS. 3 to 5 to designate the particular mixtures or structures referred to in the flow diagram which these figures are intended to illustrate.

In FIG. 3, the shaped, stratified liquid mixture 16 has a main body of elastomeric containing liquid 14 with hollow spheres 12 substantially uniformly distributed therein. On top of this is a distinguishable but integral layer 18 of the same liquid material as in the lower layer 14, but, as illustrated, the stratified layer 18 contains no hollow spheres therein. A stratified shaped mixture of this type can be obtained from a shaped mixture such as shown in FIG. 2, by gravity, centrifuging or other mechanical handling which will cause part of the liquid material in the shaped mixture to concentrate as a stratified layer free of hollow spheres.

The rigid sheet 20 in FIG. 4 consists of a matrix of elastomeric material 22 throughout which there is dispersed a multitude of hollow spheres 12. By mechanical working, e.g., crushing by pressure, the rigid structure of the type shown in FIG. 4 is transformed into a spongy structure of elastomeric material 24, such as shown in FIG. 5. This sheet 24 consists of a solid matrix of elastomeric material 22 filled with pores 26 which contain the remnants of the crushed friable spheres 12 shown in their uncrushed condition in FIG. 4.

FIG. 6 illustrates a form of elstomeric material structures which can be prepared in accordance with this present invention. The sheet 28 of FIG. 6 consists of a base layer 30 of elastomeric material 26 containing a multitude of pores 22 filled with remnants of crushed hollow spheres, and an integral but thinner surface layer 32 of the same elastomeric material 26, as contained in the base layer 30 but, as seen from FIG. 6, the surface layer 32 contains no pores and is substantially impervious to liquids and other fluids. The type of structure shown in FIG. 6 is obtained through the subsequent treatment of a stratified liquid mixture such as illustrated in FIG. 3.

As will be evident from the disclosure of the present invention, embodiments of the invention may comprise structures or articles, in sheet or other form, of (a) rubbery polyurethanes, (b) silicone rubbers, (c) vinyl chloride plastisols, and (d) various synthetic rubbers; with such structures or articles containing hollow bodies or spheres disposed throughout all portions or sections thereof or disposed only throughout certain portions of sections; and with said hollow bodies or spheres being either in broken or unbroken form, the broken form thereof providing portions or sections which are of spongy or resilient character. With respect to the structures or articles of rubber or the like, their preparation can include the well known coagulation methods, solvent evaporation methods and/or vulcanization procedures.

The two essential components of the new structures and compositions of this invention are first, the matrix forming material and, secondly, the hollow, friable bodies which are dispersed in the matrix forming material while it is in a liquid or flowable condition, and which are subsequently fixed in the matrix after it is solidified.

For the production of spongy materials as described in this specification, it is necessary to employ an elastomeric material as the solid matrix. A wide variety of different natural and synthetic materials fall in the category of "elastomeric materials" and are usable in forming the required matrices. Actually, elastomeric materials (also referred to as elastomers) are today a recognized category of materials. This term, as used in this specification and the accompanying claims, therefore, is employed in its generally accepted meaning, i.e., the term "elastomeric material" means "all elastic, rubber-like substances which can be elongated or compressed to a dimension at least about 50% changed from the original dimension, and which, upon release of the dimension-altering force, will return to substantially the original dimension."

As previously indicated, of the above mentioned elastomeric starting materials, liquid polyurethanes and polyvinylchloride plastisols are greatly preferred to produce commercially useful sponge products because their resultant cured solid forms have the best balance of good tensile strength, elongation and relatively high hardness. On the other hand, the hardness and tensile strength of commercially available liquid polysulfide polymers such as "Blak-Tufy," a compounded Thiokol product of the Perma Flex Mold Company generally used for making flexible molds and patterns, is so low that great difficulty is encountered in crushing the hollow spheres without damaging the rubbery binder. The hardness and tensile strength of solid silicone rubber obtained from a liquid polydimethyl siloxane rubber is too low generally to obtain a good sponge product. It is also difficult to make sponges from polyethylene, or a latex of natural rubber or a styrene-butadiene copolymer by coagulating the latex and stirring hollow spheres in the coagulum. The polyethylene binder is generally too hard and brittle to produce a satisfactory sponge while the rubber made by coagulation lacks adhesive strength and tends to crumble and break up when attempts are made to crush the hollow spheres.

Natural rubber is probably the best known and most historic of elastomeric materials. However, its chemical resistance to many reagents is poor, and for many applications, newer synthetic elastomers have replaced rubber.

The final solid matrix required of the new structures of this invention may be formed from various sources of elastomeric materials. Thus, the liquid mass in which the hollow bodies or spheres are dispersed and which is molded to form the final desired products may contain elastomer, either as a dispersion in some suspending medium e.g., a rubber emulsion such as latex, or a solution of an elastomeric material in a volatile solvent. The liquid mixture used as a source of elastomeric material need not comprise the final elastomer per se, but rather necessary reactants in stoichiometric proportions needed to react together and form an elastomeric material, i.e. a polyisocyanate and a polyhydroxy compound which will produce a polyurethane elastomer. A wide variety of various combinations of substances can be used, as would be immediately apparent to those skilled in the art from the description of the invention given herein. For the purpose of simplifying the description of the invention herein and in the appending claims, the term "solidified elastomer precursor" is employed to designate the broad category of materials from which the moldable liquid mixtures are formed as a prerequisite to the final production of the spongy structures. It will be understood that this term "solidified elastomer precursor" includes not only dispersions or solutions of elastomers per se, but also the liquid mixtures of reactants capable of forming elastomeric materials under conditions of temperature or the like employed to transform the moldable liquid mixtures into the final solid matrix enclosing the friable hollow bodies.

Rubbers are preferred for use as elastomeric materials in carrying out the processes and making the products of this invention. Rubbers which may be used in forming the new products include latex crepes, smoked sheets, scrap rubber, reclaimed rubber, wild rubber, and similar natural rubbers. Also, synthetic rubbers may be used, such as rubbery copolymers of a conjugated diolefin having less than seven carbon atoms including butadiene and dimethyl butadiene and a copolymerizable mono vinyl compound including styrene and acrylonitrile. Other suitable synthetic rubbers are olefin/polysulfide rubbers, butyl rubber and similar olefin/butadiene copolymers, polychloroprene, silicone rubbers, and similar elastomers. Combinations of synthetic rubbers or synthetic and natural or crude rubbers may be used. The term "rubber" as used herein and in the appending claims, is intended to include these materials, as well as the isomerized or halogenated derivatives thereto, e.g., cyclized or similar heat treated rubber, chlorinated rubbers, rubber hydrochlorides and the like.

When the butadiene copolymers with a copolymerizable mono olefinic compound are used, the preferred rubbery copolymers are those having 50 to 85 parts by weight of butadiene and 15 to 50 parts of styrene or acrylonitrile. The preferred butadiene/styrene copolymers have 60 to 75 parts by weight of butadiene and 25 to 40 parts by weight of styrene.

The silicone rubbers include polydimethyl siloxanes, polydiethylsiloxanes, etc. having recurring units of the general formula:

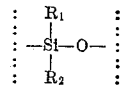

where $R_1$ and $R_2$ are hydrocarbon radicals, preferably methyl radicals, but may also be ethyl and phenyl radicals or mixtures thereof.

In addition to rubbers, other elastomeric materials which can be used include resilient polyurethane plastics made from polyisocyanates and polyhydroxy containing compounds, resilient polyvinyl halide compositions and plastisols thereof, elastomeric polymers and copolymers of acrylic or methacrylic acid esters, amides, nitriles and the like, fluorine-containing elastomeric polymers prepared from fluorine-containing olefins, elastomeric polyvinyl ethers and similar high molecular weight synthetic organic polymers which are elastomeric in nature.

Of the preferred elastomeric starting materials, namely polyurethanes and polyvinyl base resins, the polyvinyl base plastisols will be discussed first. Outstanding sponge products can be made using a vinyl base elastomer which is preferably polyvinyl chloride or a copolymer of vinyl chloride and vinyl acetate in which the vinyl chloride is present generally in amounts of about 80 to 95 percent by weight. Other suitable vinyl halides are vinyl bromide or copolymers of vinyl chloride or vinyl bromide with vinyl acetate or vinylidene chloride.

As is well known in the art, vinyl plastisols such as polyvinyl chloride plastisols can be obtained by dispersing the polyvinyl chloride in a plasticizer such as dioctyl phthalate, dioctyl sebacate, didecyl phthalate or octyl decyl phthalate to prepare a vinyl base plastisol starting material in accordance with the present invention.

Suitable polyurethane rubbers, as is well known in the art, are rubbery reaction products of generally about .8 to 2 mole equivalent weights, and preferably about .9 to 1.5 mole equivalent weights, of an organic polyisocyanate having 2 to 3 isocyanate groups and one mole equivalent weight of a hydroxy terminated polyol. The best results are usually obtained with about equal moles or from .95 to 1.1 moles, of an organic diisocyanate and a polyol having a molecular weight of generally about 500 to 5000 and preferably 1500 to 2500. The preferred polyurethane rubbers are reaction products of an organic aromatic diisocyanate and a dihydroxy terminated polyester of a polycarboxylic acid such as adipic acid and a polyhydric alcohol such as ethylene glycol, propylene glycol or mixtures thereof.

Suitable polyisocyanates are hexamethylene diisocyanate, 2,4- or mixtures of 2,4- and 2,6-tolylene diisocyanates, and p,p′p″-triisocyanato triphenyl methane, although the best results are obtained with p,p′-diisocyanato diphenyl methane.

Other suitable polyols in addition to the polyesters are polyalkylene ether glycols or triols such as polypropylene ether glycol, poly (ethylene-propylene) ether glycol and polytetramethylene ether glycol.

The polyurethane elastomers may be crosslinked by additional organic diisocyanate or triisocyanate or other vulcanizing agents such as organic peroxides including ditertiary butyl peroxide, dicumyl peroxide, or dimethylol urea, or 4,4′-methylene bis (2-chloroaniline), or even sulfur if some unsaturated material is used as part of the polyurethane forming reactants. The curing agent is generally used in amounts of about ½ to 8, or even up to 12 parts by weight per 100 parts elastomer.

As indicated, elastomeric materials may be present in the liquid moldable mass in the form of a dispersion in some suspending medium. Water is recommended as a suspending medium because of its cheapness and because emulsions or other suspensions of the elastomeric materials can be rather easily prepared with it. Natural rubber latex is an example of such a suspension. Synthetic rubber latexes made by polymerization or copolymerization of suitable monomers dispersed in water can be employed. On the other hand, aqueous emulsions of elastomeric materials prepared by emulsification of the preformed polymers or copolymers using suitable emulsifying or dispersing agents, can also be utilized.

Instead of being present in the moldable fluid mixtures as dispersions, the elastomeric material can be in the form of a solution in some suitable, preferably volatile, solvent. The particular solvent employed, of course, will depend upon the elastomeric material which is used. For rubbers, generally mixtures of aromatic hydrocarbons are suitable, e.g., benzene, toluene or the like.

The liquid moldable mixtures will generally contain, in addition to the friable bodies or spheres and elastomeric materials, various modifying agents, such as plasticizers, fillers, anti-oxidants, reinforcing agents, dyes, pigments, accelerators, vulcanizing agents, cross-linking agents or the like. Obviously, wide variations in the amounts and nature of these materials are possible, and they are to be incorporated in the moldable mixtures and final products, as dictated by the ultimate desired characteristics of the final products. Use of such modifying or addition agents is standard practice in the rubber compounding field, and those skilled in the art will understand how such materials are to be utilized in carrying out the operations of this invention. For instance, it is well known that sulfur can be used to cure natural and synthetic butadienestyrene rubbers. Also organic peroxides, such as benzoyl peroxide, lauroyl peroxide and tertiary butyl peroxide can be used to cure the above elastomers as well as silicone rubbers and the above curing agents are generally employed in amounts of about ½ to 8 up to even 12 parts by weight per 100 parts of elastomer.

The hollow, friable spheres or other shaped bodies constitute a second essential component of the new structures and compositions of this invention. The preferred materials of this type for the purposes of the invention are hollow spheres of clay which are relatively small in size, and which have a diameter between about 0.01 to 1 mm., the larger diameter spheres generally producing a softer resilient sponge end product than smaller diameter spheres. The commercially available clay spheres made and sold by the Ferro Corporation under the trade name "Kanamite" are examples of the preferred forms of hollow, friable spheres which can be used in the new compositions and products. However, other friable, hollow bodies can be employed, e.g., small glass bubbles, and equivalent hollow, friable bodies may be used, in various combinations, if desired. Spherical shaped bodies are preferred, but other shapes, such as elliptical shapes, "tear drop" shapes or the like can be used. The preferred clay spheres or generally spherical bodies have relatively thin shells which are preferably about only ⅓ to ⅛ the length of the diameter. The spheres weigh about 16–18 pounds per cubic foot. The preferred average diameter of the spheres is about 0.02 to 0.04 inch and the fused clay shell is about ⅓ by volume of each of the spheres.

The clay spherical bodies are stable and do not melt until temperatures in the range of 2700° F. are reached so that high curing temperatures can be used to vulcanize the elastomer matrix with no damage to the spherical bodies.

The proportion of elastomeric material to friable, hollow spheres in the moldable compositions in the final products of the invention, in most applications may be varied over wide ranges. The exact percentage of hollow spheres used in compositions of products will depend to some extent upon the porosity or sponginess desired in the final product, but spongy structures of most desired properties have been found to be those which are made from a rigid structure, prior to crushing of the spheres, containing 10 to 70 volume percent spheres and 30 to 90 volume percent elastomeric material. The best flexible closed cell elastomeric composition suitable for shoe soles and the like are made by using about 40 to 60 parts by weight of hollow spherical bodies per 100 parts by weight of elastomer. When less than 20 parts hollow spheres are used, the porosity is not as uniform or as widespread as generally desired and flexibility is decreased. On the other hand when more than 125–150 parts by weight is used, the composition is too porous and is crumbly, having little tear strength.

Hollow, friable clay spheres, such as "Kanamite" clay, cannot be milled into a plastic rubber or other elastomer composition because the hollow spheres are smashed. On the other hand, it has been discovered that the hollow, friable clay spheres may be mixed with elastomeric material or a solidified elastomer precursor which is in a liquid mixture having sufficient fluidity that it can be stirred with a paddle or propeller type stirrer or equivalent stirring device. Suitable mixtures of the elastomer and hollow spheres also can be formed from an elastomer compound of relatively low viscosity in a Banbury mixer, commonly used in the rubber industry, where apparently at least a majority of the hollow spheres are not broken during the mixing step.

The liquid mixture with hollow spheres dispersed therein can be subjected to a variety of operations in order to transform the liquid mixture into a solid structure. For example, the liquid mixture can be charged into a suitable mold by pouring, extruding, or in any other suitable fashion, without additional treatment after the stirring operation, by which the hollow sphere dispersion is formed, and the molded liquid mixture can then be subjected to those conditions which are required to solidify the mass into a rigid structure. On the other hand, as shown in FIG. 1, the liquid mixture can be treated so as to form stratified sections or layers thereof, one or more of which contain dispersed spheres and other stratified sections or layers which contain no spheres. This can be done, for example, by subjecting the liquid mixture after it has been placed in a mold to gravity, centrifugal force or other suitable means to cause concentration of the spheres at one or the other surfaces of the shaped mass. As an alternative, a stratified layer of the elastomeric containing liquid without spheres therein can be created by pouring a sphere-free layer of the same liquid which is used for admixing with the hollow spheres, onto a body of the same liquid into which a multitude of the hollow spheres have been stirred. Products formed according to this invention may be sheets or panels having a base layer or section with voids therein formed from crushed spheres and a surface layer which is nonporous, formed of the same elastomeric material matrix. Products of this type are diagrammatically illustrated in FIG. 6. Laminar sheets of this type can be used for a number of different construction purposes, such as upholstery material for furniture, wall panels for buildings, sound and heat insulating sheets in the construction of automobiles and other vehicles, and for a wide variety of other uses. Furthermore, the use of centrifugal force for the disposition of the hollow bodies or spheres in only a portion or section of the material enables structures or articles of tubular form to be readily made, with the outer layer or section of each tubular structure or article being of nonporous form and the inner layer or section being the one containing the hollow bodies or spheres, which subsequently can be broken if it is desired that such inner layer or section be of spongy form.

Various conditions may be employed to cause the liquid mixture comprising the elastomeric material and dispersed hollow, friable spheres to solidify into a solid matrix comprising the elastomeric material with the hollow spheres fixed in dispersed condition therein. Actually, the exact conditions employed to accomplish this solidification will vary with the different type of liquid mixtures which can be used in carrying out the new operations of this invention. For example, in the case of vinyl resin plastisols, elevated temperatures alone can be used which will cause the polymer component of the plastisols to dissolve in the plasticizer component and bring about a solidification of the resulting polymer plasticizer mixture. Similarly, in the case of volatile solvent solutions of elastomeric material, elevated temperatures alone or in combination with reduced pressures, may be used to evaporate the solvent and leave the solid elastomeric material residue to create the desired matrix. On the other hand, in most cases where a mixture of reactants which are not elastomeric materials themselves, but which will react to form final solid elastomers, usually just a combination of elevated temperatures and time will bring about the desired solidification, since suitable reaction catalysts or condensing agents will have been added to the liquid mixture at the time it is formed or shortly before it is molded into the desired shape. In other cases, solidification of the liquid mixture will result merely from allowing the molded mass to remain at room temperature since, in such cases, suitable catalysts or other curing agents will have been added which will bring about a curing or vulcanization of the active components at room temperature. The examples given above are illustrative of the various types of conditions which can be employed to effect the required solidification of the liquid mixtures to form the rigid structures which incorporate the hollow, friable spheres in the solid matrix.

The mold of the solid structure, as referred to above, is next subjected to mechanical working in order to crush the friable spheres within those portions of the matrix of elastomeric material which are to be of spongy form. At the same time, the mechanical working is conducted in such fashion that the elastomeric material matrix is not itself injured or destroyed. For example, a sheet of the rigid structure comprising the matrix and dispersed hollow spheres may be pressed together in a suitable press to force the surfaces of the sheet together so that its volume approaches the volume of the elastomeric matrix itself. The rigid article or slab can be pressed or passed through rolls when the volume is only 1½ times the matrix and obtain benefits of the present invention. This will effect a crushing or breaking of the friable spheres and upon release of the crushing pressure, the resilient elastomeric material in the matrix will return to its original volume, leaving small voids where the hollow spheres existed prior to the pressing operation. Each one of these voids will contain the fine particle remnants of the crushed spheres, as can be seen by cutting through a section of the sheet or other structure with a sharp knife or other cutting device. When this is done, the fine powdered remnants of the individual crushed spheres can be poured from each of the individual voids containing the remnants.

The following examples illustrate the present invention:

*Example 1*

A cellular polyurethane elastomer having properties similar to commercially produced chemically blown polyurethane foams was produced by mixing a liquid polyurethane reaction product of a polyester and a diisocyanate with "Kanamite" clay spheres (unicellular spherical hollow fused clay particles made and sold by Ferro Corporation, Cleveland, Ohio), according to the following formulation.

Ingredients: Parts by weight
Polyester urethane liquid (reaction product of about 1.1 moles p-p'-diisocyanato diphenyl methane and 1 mole of a poly (ethylene-propylene) adipate having a molecular weight of about 1800) _____ 100
Plasticizer ("Flexol 4-GO," a polyethylene glycol di-ethyl hexoate sold by Union Carbide Corp.) __ 30
Curing agent (MOCA sold by E. I. Du Pont de Nemours & Co., 4,4'-methylene bis(2-chloro-aniline) _ 11
Friable hollow spheres ("Kanamite," Ferro corporation), 35 mesh _____ 50

The curing agent was dissolved in the plasticizer at 212° Fahrenheit. The polyester urethane was heated to 212° F. and mixed with the plasticizer containing the curing agent in solution. The friable hollow clay spheres were added to the above described ingredients and mixed therein with stirring.

The resultant mixture was poured into a mold and cured for 30 to 45 minutes at 212° F. which was enough to permit removal of the polyurethane material from the mold. The curing was continued by subjecting the molded material to a temperature of 212° F. for 4 hours.

The cured polyurethane material was pounded with a hammer to crush the friable clay spheres leaving the rubbery polyurethane undamaged. The resultant cured and crushed polyurethane elastomer is an excellent shoe sole and shoe heel material, the cellular structure being very uniform and being predominately formed of closed cells.

The hollow spheres tended to float to the surface during cure to leave a thin layer of unfilled polyurethane on the bottom. Thus the sample, after crushing, had a relatively thick cellular layer and a relatively thin solid nonporous layer.

When the above formulation was rotated until solid by curing the polyurethane while rotating the polyurethane in a glass test tube, the hollow spheres were distributed relatively uniformly throughout the structure.

*Example 2*

A cellular polyvinyl chloride elastomer was prepared by dispersing 50 parts by weight of +35 mesh hollow clay spheres into 100 parts by weight of plastisol which was previously prepared by dispersing 100 parts polyvinyl chloride resin in 70 parts by weight of di-octyl phthalate plasticizer. One part of Epon 828 epoxy resin was added as a stabilizer.

Epon 828, one of the group of Epon resins sold by the Shell Chemical Corporation, is a liquid condensation product of epichlorohydrin and bisphenol-A having a molecular weight of about 384.

The mixture was poured into an aluminum evaporating dish and fused by heating for 15 minutes at 350° Fahrenheit. After cooling, the polyvinyl chloride material was removed from the cup and subjected to a crushing operation that reduced the hollow spheres to clay powder and provide a resilient, flexible cellular material having a uniform closed cell structure. The hollow spheres tended to float to the surface during fusing or curing leaving a relatively thin layer of solid polyvinyl chloride on the bottom of the sample, the thin layer being about $\frac{1}{20}$ the height of the ½ inch high 2¼ inch diameter sample.

The above described cellular polyvinyl chloride can be used for shoe soles and crash pads for automobiles.

It is noted in the above examples that elastomeric structures were prepared having cellular layers much thicker than the unfilled layers since the hollow fused clay spheres float toward the surface of the liquid starting material before it solidifies during curing. Laminated structures may also be prepared where the unfilled layer is thicker, say to 2 to 4 times as thick as the cellular layer by varying the time of solidification or curing of the liquid elastomeric starting material until the filled layer is of the desired thickness. When the curing of a mixture is delayed after pouring in a mold, the thickness of the resultant cellular layer can be made equal to, or even much less than the thickness of the resultant unfilled layer. A structure having a relatively thin spongy portion and a relatively thick spongy portion may be prepared by centrifuging the liquid mixture to cause the hollow particles to collect in a portion of the article. The relative thickness of the two layers can be varied by solidifying the mixture when the thickness of the filled portion has reached the desired dimensions.

The final position of the small hollow particles in the matrix can be controlled to some extent by coating the particles with a suitable adhesive. The adhesive coatings are particularly effective in helping to prevent escape of the hollow particles from exposed surfaces of the structures in which they are used.

Valuable rigid products may also be made by mixing the friable hollow spheres with liquid inorganic water-setting agents such as plaster of Paris, gypsum plaster, Portland cement and sodium silicate or even low melting alloys having a melting point preferably under 1400 to 1500° F. such as solders including Wood's metal and white metal generally using the amounts previously described for the elastomeric materials.

In the above examples, other amounts and sizes of friable hollow spheres can be substituted for the hollow spheres used as previously described. Also other elastomers, as previously discussed, can be substituted for the polyester urethane and polyvinyl chloride liquid elastomeric starting materials. For the best results, as previously indicated, the polyester in the polyester urethane can be substituted for in whole or part by polyalkylene ether glycols of the general formula HO—$(RO)_n$—H where $n$ is an integer of 1 to 50 and R is a divalent hydrocarbon preferably an alkylene group of 1 to 6 carbon atoms, such as propylene, butylene and neopentylene. In example 2, for the best resilient sponge structures, the polyvinyl chloride resin may be substituted in whole or part by a copolymer of vinyl chloride and vinyl acetate in which the vinyl acetate comprises preferably about 50 to 20 percent by weight of the copolymer. The plasticizer used may be substituted in whole or part by other polyvinyl halide plasticizers preferably using about 50 to 150 parts by weight of plasticizer per 100 parts polyvinyl halide.

Although spongy structures of elastomeric materials, such as sponge rubber, have been known for many years and a wide variety of different procedures have been developed for creating such products, there has been described above a fundamentally new type of procedure by which spongy, elastomeric structures can be formed. Products made by these new operations are characterized by a number of unique properties and features, e.g., controlled size and uniformity of pores, and the new operations are particularly noteworthy because they can be used with such a large and varied group of different elastomeric materials.

The resulting sheets or other structures, of spongy form in whole or in part, can be used for all purposes for which related prior known products are known to be useful, but the new laminar sheets which constitute one type of product which can be made as described above, present the artisan, mechanic or craftsman with a new class of product which offers opportunities for creation of new and novel types of constructions or the like.

What is claimed is:

1. A method of making a cellular elastomeric material comprising the steps of mixing about 100 parts by weight of a liquid elastomeric material selected from a member of the group consisting of a polyurethane and a plasticized polyvinyl chloride and about 20 to 150 parts by weight of a plurality of friable hollow fused clay spheres to form a mixture, solidifying the elastomeric material to form a relatively rigid structure of said hollow spheres in a matrix of said elastomeric material, and thereafter compressing the structure to crush the spheres and reduce the fused clay to powder without damaging the matrix thereby producing a resilient cellular material.

2. A method as defined in claim 1 in which the elastomeric material is a polyurethane.

3. A method as defined in claim 1 in which a solid non-porous layer is formed adjacent said cellular material by stratifying the mixture whereby the clay spheres collect as a separate stratified layer and another layer is formed relatively free of said spheres, and thereafter solidifying the elastomeric material when the stratified layer is of the desired thickness.

4. A flexible resilient cellular article comprising a solid elastomeric material selected from a member of the group consisting of a polyurethane and a plasticized polyvinyl chloride, said material having a plurality of pores therewithin, said pores containing remnants of crushed hollow friable bodies, the amount of hollow bodies used per 100 parts by weight of said elastomeric material being about 20 to 150 parts by weight.

5. An article as defined in claim 4 in which the elastomeric material is a polyurethane.

6. A flexible resilient shoe sole material comprising a cellular layer of the cellular article defined in claim 4 and also a solid non-porous layer of said elastomeric material adjacent to said cellular layer.

References Cited in the file of this patent

UNITED STATES PATENTS

| | | |
|---|---|---|
| 948,541 | Coleman | Feb. 8, 1910 |
| 1,045,234 | Willis et al. | Nov. 26, 1912 |
| 1,882,792 | Fischer | Oct. 18, 1932 |
| 2,353,877 | Chollar | July 18, 1944 |
| 2,517,724 | Schuh | Aug. 8, 1950 |
| 2,526,311 | Wilson | Oct. 17, 1950 |
| 2,564,397 | Duddy | Aug. 14, 1951 |
| 2,766,800 | Rockoff | Oct. 16, 1956 |
| 2,797,201 | Veatch et al. | June 25, 1957 |
| 2,806,509 | Bozzacco et al. | Sept. 17, 1957 |
| 2,849,028 | Clark et al. | Aug. 26, 1958 |
| 2,860,379 | Beckadolph et al. | Nov. 18, 1958 |